Patented June 20, 1944

2,352,124

UNITED STATES PATENT OFFICE 2,352,124

THERAPEUTIC GOLD COMPOUND

Albert B. Sabin and Joel Warren, Cincinnati, Ohio, assignors to The Children's Hospital, Cincinnati, Ohio, a corporation of Ohio No Drawing. Application November 15, 1941, Serial No. 419,294

3 Claims. (Cl. 167—68)

It has been known for some time that certain gold compounds may be effective in the treatment of rheumatoid arthritis, (arthritis deformans, chronic infectious arthritis). However, the toxicity of such compounds has been such that they have not been recommended for general use. Among these is sodium aurothiomalate, a drug formed by neutralizing thiomalic acid with sodium hydroxide and precipitating the reaction of this neutralized solution with gold iodide by means of methyl alcohol, in which the sodium aurothiomalate is insoluble.

This product is highly soluble in water, and its use in treating rheumatoid arthritis has been reported to be effective except for the toxicity thereof, which has rendered its use dangerous in many cases.

We have discovered that calcium aurothiomalate has enhanced properties or curative effect in experimental chronic infectious arthritis, and that it is practically lacking in toxicity as tested in mice. This product is insoluble in water and oil unless under acid conditions when it does become soluble.

To prepare this compound, which is a new compound so far as we are advised, an excess of calcium chloride is added to a solution of the sodium aurothiomalate. This will result in replacement of the sodium by the calcium, whereupon the calcium aurothiomalate will precipitate out of solution, since it is not soluble in water. There is a very complete recovery by this process since the solution is best kept practically neutral, and although there would be other ways of producing the new product, the above is recommended as the simplest.

For use the product, which after precipitation is washed in water, in absolute alcohol and in ether and dried to form a pale yellow powder, is ground into a suitable mild oil, and well agitated to form a suspension which is relatively stable. Oil of sweet almonds has been found to be a suitable vehicle. Intramuscular injection is a satisfactory mode of application.

The formula of the new compound may be expressed as follows:

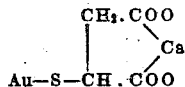

Barium and strontium aurothiomalate have been prepared in a similar manner and were found to be as insoluble in water and oil as calcium aurothiomalate.

There is now available a micro-organism which infects mice with a disease which resembles infectious chronic arthritis in humans, and which reacts to treatments such as have been shown to have effect on such arthritis in humans, while resisting treatments which do not have effect in the treatment of humans. Mice when tested with the sodium aurothiomalate for toxicity as compared to the new calcium compound, have shown that as to them, the calcium compound is not toxic, at least in doses as high as 100 mg. which is as much as may be practically administered to 20 gm. mice, whereas the sodium compound is toxic to the extent that it will kill all mice in doses of 15 mg. and most mice with half the dosage when the drug is given by intramuscular injection.

Testing for curative effect on mice shows that a dosage of about half as much of the calcium compound, as of the sodium salt is required to give equal results. As measured in mice, the "margin of complete safety"

$$\left( \text{i. e., } \frac{\text{maximal dose tolerated by nearly 100 per cent of mice}}{\text{minimal therapeutic dose}} \right)$$

was found to be at least 100 times greater for the calcium salt than for the sodium salt of aurothiomalate.

While the toxicity and effectiveness in humans is not necessarily the same as in mice, a short period of clinical use has indicated that the tests on mice may be a fairly reliable gauge of effects on humans.

Furthermore we have found that there are insoluble compounds the behavior of which would be expected to be like the calcium compound, to-wit the barium and strontium compounds. These are produced by the same process as the calcium compound as hereinabove set forth.

Having thus described our invention, what we claim as new and desire to secure by Letters Patent is:

1. A therapeutic agent comprising calcium aurothiomalate.

2. A therapeutic agent comprising calcium aurothiomalate suspended in finely divided form in a mild oil.

3. A therapeutic agent comprising an insoluble alkaline earth metal aurothiomalate.

ALBERT B. SABIN.
JOEL WARREN.